(12) United States Patent
Butzke

(10) Patent No.: US 9,221,014 B2
(45) Date of Patent: Dec. 29, 2015

(54) FLUID INJECTION CONTROL SYSTEM

(71) Applicant: Tenneco Automotive Operating Company Inc., Lake Forest, IL (US)

(72) Inventor: Gary Butzke, Brighton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 9 days.

(21) Appl. No.: 14/085,308

(22) Filed: Nov. 20, 2013

(65) Prior Publication Data

US 2015/0139859 A1    May 21, 2015

(51) Int. Cl.
F01N 3/00 (2006.01)
B01D 53/94 (2006.01)
F01N 3/20 (2006.01)

(52) U.S. Cl.
CPC ............... *B01D 53/94* (2013.01); *F01N 3/206* (2013.01)

(58) Field of Classification Search
CPC .......... F01N 11/00; F01N 3/206; B01D 53/94
USPC ............... 60/272–324; 417/44.2, 12; 700/282
See application file for complete search history.

(56) References Cited

U.S. PATENT DOCUMENTS

| 6,209,315 | B1 * | 4/2001 | Weigl .............................. 60/274 |
| 8,109,077 | B2 | 2/2012 | Reba et al. |
| 8,171,721 | B2 | 5/2012 | Boddy et al. |
| 2008/0138215 | A1 * | 6/2008 | Jochumsen et al. .......... 417/307 |
| 2009/0113877 | A1 | 5/2009 | Van Nieuwstadt |
| 2009/0326788 | A1 * | 12/2009 | Yuasa et al. ................... 701/104 |
| 2010/0031639 | A1 | 2/2010 | Kwon |
| 2010/0205937 | A1 | 8/2010 | Duret et al. |
| 2010/0242439 | A1 | 9/2010 | Domon et al. |
| 2010/0319324 | A1 | 12/2010 | Mital |
| 2011/0239625 | A1 | 10/2011 | Fokkelman et al. |
| 2012/0286063 | A1 | 11/2012 | Wang et al. |
| 2013/0031890 | A1 | 2/2013 | Shovels et al. |
| 2013/0125532 | A1 | 5/2013 | Eriksson et al. |

FOREIGN PATENT DOCUMENTS

WO    WO-2011126433 A1    10/2011

* cited by examiner

*Primary Examiner* — Jesse Bogue
*Assistant Examiner* — Kelsey Stanek
(74) *Attorney, Agent, or Firm* — Harness, Dickey & Pierce, P.L.C.

(57) ABSTRACT

An exhaust aftertreatment system may include a tank, an injector, a supply conduit, a pump, a pressure sensor, and a control module. The tank may contain a volume of a fluid. The injector may be configured to inject the fluid into a stream of exhaust gas discharged from the combustion engine. The supply conduit may fluidly connect the tank and the injector. The pump may pump the fluid from the tank to the injector. The control module may be in communication with the pressure sensor and the pump and may control the pump based on first and second measurements from the pressure sensor. The first measurement may be indicative of a first pressure within the supply conduit when the pump is operating. The second measurement from the pressure sensor may be indicative of a second pressure within the supply conduit when the pump is not operating.

19 Claims, 2 Drawing Sheets

FLUID INJECTION CONTROL SYSTEM

FIELD

Figure 1:
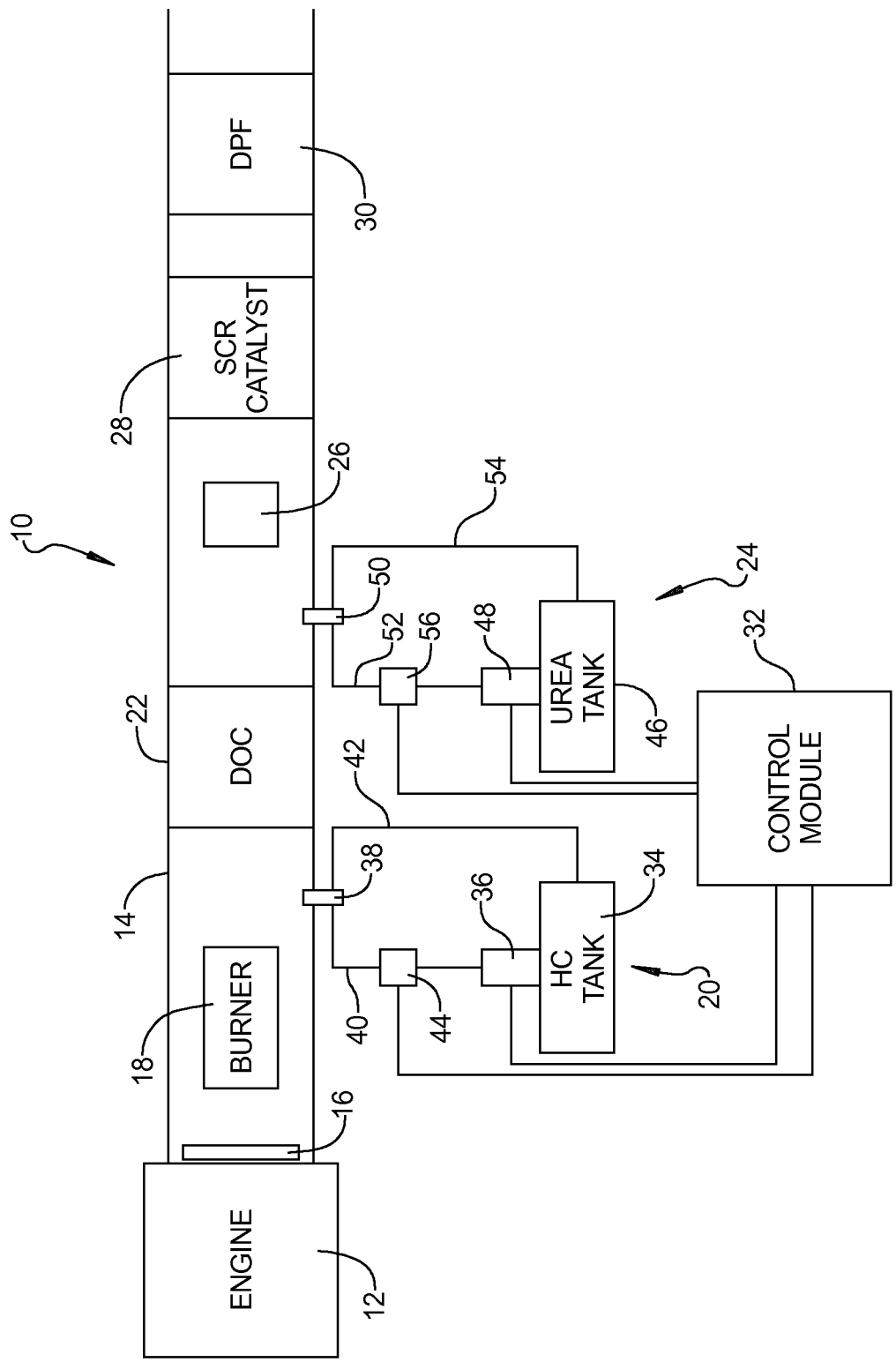

The present disclosure relates to a fluid injection control system for an aftertreatment system of a combustion engine.

BACKGROUND

This section provides background information related to the present disclosure and is not necessarily prior art.

In an attempt to reduce the quantity of $NO_x$ and particulate matter emitted to the atmosphere during internal combustion engine operation, a number of exhaust aftertreatment devices have been developed. A need for exhaust aftertreatment systems particularly arises when diesel combustion processes are implemented. Typical aftertreatment systems for diesel engine exhaust may include one or more of a diesel particulate filter (DPF), a selective catalytic reduction (SCR) system (including a urea injector), a hydrocarbon (HC) injector, and a diesel oxidation catalyst (DOC).

During engine operation, urea may be injected into the exhaust stream to reduce nitrogen oxides in the exhaust stream. The DPF traps soot emitted by the engine and reduces the emission of particulate matter (PM). Over time, the DPF becomes loaded and begins to clog. Periodic regeneration or oxidation of the trapped soot in the DPF is required for proper operation. To regenerate the DPF, relatively high exhaust temperatures in combination with an ample amount of oxygen in the exhaust stream may be needed to oxidize the soot trapped in the filter.

The DOC is typically used to generate heat to regenerate the soot loaded DPF. When hydrocarbons (HC) are sprayed over the DOC at or above a specific light-off temperature, the HC will oxidize. This reaction is highly exothermic and the exhaust gases are heated during light-off. The heated exhaust gases are used to regenerate the DPF.

Under many engine operating conditions, however, the exhaust gas is not hot enough to achieve a DOC light-off temperature of approximately 300° C. As such, DPF regeneration may not passively occur. Furthermore, $NO_x$ adsorbers and selective catalytic reduction systems typically require a minimum exhaust temperature to properly operate. Therefore, a burner may be provided to heat the exhaust stream upstream of the various aftertreatment devices to a suitable temperature to facilitate regeneration and efficient operation of the aftertreatment devices.

While aftertreatment systems have included fluid injectors (such as HC injectors and urea injectors) in the past, it may be desirable to provide a fluid injection system that more accurately controls the amount of fluid injected into the exhaust stream for a variety of different vehicle configurations.

SUMMARY

This section provides a general summary of the disclosure, and is not a comprehensive disclosure of its full scope or all of its features.

In one form, the present disclosure provides an aftertreatment system for treating exhaust gas discharged from a combustion engine. The aftertreatment system may include a tank, an injector, a supply conduit, a pump, a pressure sensor, and a control module. The tank may contain a volume of a fluid. The injector may be configured to inject the fluid into a stream of exhaust gas discharged from the combustion engine. The supply conduit may fluidly connect the tank and the injector. The pump may pump the fluid from the tank to the injector. The pressure sensor may engage the supply conduit. The control module may be in communication with the pressure sensor and the pump and may control the pump based on first and second measurements from the pressure sensor. The first measurement may be indicative of a first pressure within the supply conduit when the pump is operating. The second measurement from the pressure sensor may be indicative of a second pressure within the supply conduit when the pump is not operating. It should be appreciated that the first pressure measurement should not necessarily be interpreted as occurring sequentially before the second pressure measurement.

In some embodiments, the second measurement is indicative of a vertical height difference between the pressure sensor and the injector.

In some embodiments, the control module may control operation of the pump based on a sum of the first and second pressures.

In some embodiments, the second measurement may be taken when the supply conduit is filled with the fluid.

In some embodiments, the aftertreatment system may include a return conduit fluidly coupling the injector and the tank. The second measurement may be taken with the return conduit substantially empty of the fluid.

In some embodiments, the aftertreatment system may include a return conduit fluidly coupling the injector and the tank. The second measurement may be taken with the return conduit substantially filled with the fluid.

In some embodiments, the fluid may include urea, ethanol, methanol, diesel fuel, or any hydrocarbon fluid or reagent fluid, for example, or any other fluid for treating exhaust gas.

In another form, the present disclosure provides an aftertreatment system that may include a tank, and injector, a pump, and a control module. The tank may contain a volume of a fluid. The injector may be configured to inject the fluid into a stream of exhaust gas discharged from a combustion engine. The pump may pump the fluid from the tank to the injector. The control module may be in communication with the pump and may control the pump based on a vertical height of the injector.

In some embodiments, the aftertreatment system may include a pressure sensor in communication with the control module and engaging a supply conduit fluidly connecting the tank and the injector. The control module may control the pump based on data received from the pressure sensor.

The aftertreatment system may be installed in a vehicle. The vertical height may be a vertical distance between the pressure sensor and the injector (i.e., a difference between a first vertical distance between the injector and a ground level upon which the vehicle is situated and a second vertical distance between the pressure sensor and the ground level).

In some embodiments, the data received from the pressure sensor may include first and second measurements. The first measurement may be indicative of a first pressure within the supply conduit when the pump is operating. The second measurement may be indicative of a second pressure within the supply conduit when the pump is not operating.

In some embodiments, the aftertreatment system may include a return conduit fluidly coupling the injector and the tank. The second measurement may be taken with the return conduit substantially empty of the fluid.

In some embodiments, the aftertreatment system may include a return conduit fluidly coupling the injector and the tank. The second measurement may be taken with the return conduit substantially filled with the fluid.

In some embodiments, the fluid may include urea, ethanol, methanol, diesel fuel, or any hydrocarbon fluid or reagent fluid, for example, or any other fluid for treating exhaust gas.

In another form, the present disclosure provides a method of controlling a pump of a fluid injection system for an exhaust aftertreatment system. The method may include operating the pump to achieve a stable target pressure in a supply conduit connecting the pump and an injector of the fluid injection system. The pump may be shut off after the stable target pressure is achieved. The fluid pressure within the supply conduit may be allowed to stabilize after shutting off the pump. A first fluid pressure measurement may be acquired within the supply conduit after the fluid pressure is allowed to stabilize. The pump may be operated after acquiring the first fluid pressure. A second fluid pressure measurement may be acquired within the supply conduit during the operation of the pump after acquiring the first fluid pressure. Operation of the pump may be controlled based on the first and second fluid pressure measurements.

In some embodiments, controlling operation of the pump based on the first and second fluid pressure measurements may include adding the first fluid pressure measurement to the second fluid pressure measurement.

In some embodiments, the fluid injection system may include a return conduit fluidly coupling the injector with a tank. In some embodiments, the second fluid pressure measurement may be acquired with the return conduit substantially empty of injection fluid. In some embodiments, the second fluid pressure measurement may be acquired with the return conduit substantially filled with injection fluid.

In some embodiments, the injection fluid may include urea, ethanol, methanol, diesel fuel, or any hydrocarbon fluid or reagent fluid, for example, or any other fluid for treating exhaust gas.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
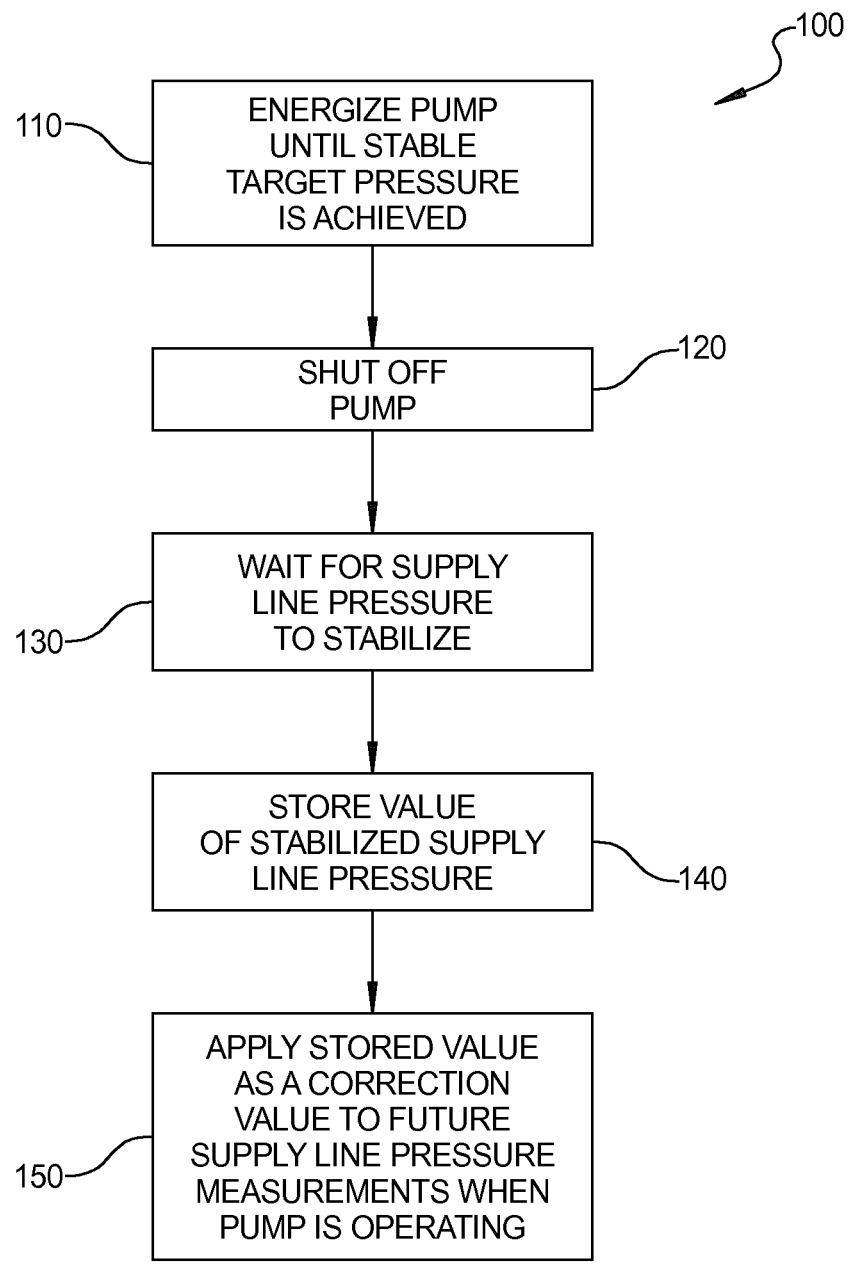

FIG. 1 is a schematic representation of an engine and an exhaust aftertreatment system having a fluid injection control system according to the principles of the present disclosure; and FIG. 2 is a flow chart illustrating a method of controlling the injection of fluid in the exhaust aftertreatment system of FIG. 1.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIG. 1 depicts an exhaust gas aftertreatment system 10 for treating the exhaust output from an exemplary engine 12 to an exhaust passageway 14. A turbocharger 16 includes a driven member (not shown) positioned in an exhaust stream. During engine operation, the exhaust stream causes the driven member to rotate and provide compressed air to an intake passage (not shown) of the engine 12. It will be appreciated that the exhaust gas aftertreatment system 10 can also be used to treat exhaust output from a naturally aspirated engine or any other engine that does not include a turbocharger.

The exhaust aftertreatment system 10 may include a burner 18, a hydrocarbon injection system 20, a diesel oxidation catalyst (DOC) 22, a diesel exhaust fluid (DEF) dosing system or urea injection system 24, one or more mixers 26, an SCR catalyst 28, a diesel particulate filter (DPF) 30, and a control module 32. The burner 18 may include an injector (not shown) that injects a fuel that may be ignited to heat the stream of gas flowing through the exhaust passageway 14. The hydrocarbon injection system 20 may spray hydrocarbons over the DOC 22, which may generate heat to regenerate (i.e., remove soot from) the DPF 30, as described above. The burner 18 may be positioned downstream from the turbocharger 16 and upstream from the DOC 22 and may be selectively operated to heat exhaust gas in the exhaust passageway 14 to a predetermined temperature to facilitate the heat-generating reaction at the DOC 22. It will be appreciated that the specific components of the aftertreatment system 10 and the positioning of those components relative to the hydrocarbon injection system 20 and/or the urea injection system 24 may vary from the configuration described above and shown in FIG. 1. It will be appreciated that the principles of the present disclosure are applicable to such variations.

The hydrocarbon injection system 20 may include a first tank 34, a first pump 36, a first injector 38, a first supply conduit 40, a first return conduit 42, and a first pressure sensor 44. The first tank 34 may contain a volume of hydrocarbon fluid. The first pump 36 may pump the hydrocarbon fluid from the first tank 34 to the first injector 38 through the first supply conduit 40. A first portion of the hydrocarbon fluid pumped to the first injector 38 may flow through the first injector 38 and into the exhaust stream in the exhaust passageway 14. A second portion of the hydrocarbon fluid pumped to the first injector 38 may flow back to the first tank 34 through the first return conduit 42. The first pressure sensor 44 may be disposed along the first supply conduit 40 and may measure a fluid pressure within the first supply conduit 40 and communicate the pressure measurements to the control module 32. These measurements may be made and communicated by the first pressure sensor 44 continuously, intermittently, or on demand.

The urea injection system 24 may include a second tank 46, a second pump 48, a second injector 50, a second supply conduit 52, a second return conduit 54, and a second pressure sensor 56. The second tank 46 may contain a volume of urea. The second pump 48 may pump the urea from the second tank 46 to the second injector 50 through the second supply conduit 52. A first portion of the urea pumped to the second injector 50 may flow through the second injector 50 and into the exhaust stream in the exhaust passageway 14. A second portion of the urea pumped to the second injector 50 may flow back to the second tank 46 through the second return conduit 54. The second pressure sensor 56 may be disposed along the second supply conduit 52 and may measure a fluid pressure within the second supply conduit 52 and communicate the pressure measurements to the control module 32. These measurements may be made and communicated by the second pressure sensor 56 continuously, intermittently, or on demand. In some embodiments, the second pump 48 may also pump water and/or air to the second injector 50 to purge or clean the second injector 50.

The control module 32 may include or be part of an Application Specific Integrated Circuit (ASIC), an electronic circuit, a processor (shared, dedicated or group) and/or memory (shared, dedicated or group) that execute one or more software or firmware programs, and/or a combinational logic circuit, for example, and/or other suitable components that provide the described functionality. The control module 32 may be a part of or include a control unit controlling one or more other vehicle systems. Alternatively, the control module 32 may be a control unit dedicated to the exhaust aftertreatment system 10. The control module 32 may be in communication with and control operation of the hydrocarbon injection system 20 and/or the urea injection system 24. The control module 32 may control operation of the pumps 36, 48 based at least in part on data received from the pressure sensors 44, 56, as will be described in more detail below.

Referring now to FIGS. 1 and 2, a method 100 will be described for controlling the hydrocarbon injection system 20 and/or the urea injection system 24 to account for a first vertical height difference between the first injector 38 and the first pressure sensor 44 and a second vertical height difference between the second injector 50 and the second pressure sensor 56. The hydrocarbon injection system 20 and the urea injection system 24 may be installed in any of a plurality of different vehicles. The vertical positioning of one or more of the injectors 38, 50 and the pressure sensors 44, 56 (relative to the ground on which the vehicle is situated) on a given vehicle may be different than the vertical positioning of one or more of the injectors 38, 50 and pressure sensors 44, 56 on another vehicle. Utilizing the method 100, the control module 32 may account for the difference in height between the first injector 38 and the first pressure sensor 44 and/or the difference in vertical height between the second injector 50 and the second pressure sensor 56 on any vehicle in which the exhaust aftertreatment system 10 may be installed.

The steps of the method 100 that are conducted to calibrate control of the hydrocarbon injection system 20 may be similar or identical to the steps that are conducted to calibrate control of the urea injection system 24. It will be appreciated that the method 100 may be carried out simultaneously for the hydrocarbon injection system 20 and for the urea injection system 24 or the method 100 may be carried out for only one of the systems 20, 24.

At step 110 of the method 100, the control module 32 may cause the pump 36, 48 to operate (i.e., pump fluid toward the injector 38, 50) until a pressure within the supply conduit 40, 52 stabilizes at a predetermined value. The control module 32 may determine that the pressure has stabilized at the predetermined value based on pressure data received from the pressure sensor 44, 56. The pressure data may be transmitted to the control module 32 continuously or intermittently. After the pressure has stabilized at the predetermined value, the control module 32 may, at step 120, cause the pump 36, 48 to shut down (or stop pumping).

At step 130, the control module 32 may wait for the pressure within the supply conduit 40, 52 to stabilize after shutdown of the pump 36, 48 at step 120. At step 140, the control module 32 may record the pressure value at which the supply conduit 40, 52 stabilizes after shutdown of the pump 36, 48 in a memory associated with the control module 32.

At step 150, the control module 32 may apply the pressure value recorded at step 140 to future pressure data received from the pressure sensor 44, 56 when the pump 36, 48 is operating. That is, during normal operation of the system 20, 24, the control module 32 may utilize pressure data from the pressure sensor 44, 56 to control operation of the pump 36, 48 (e.g., adjust the duration and/or speed at which the pump 36, 48 runs to achieve a desired effect on the aftertreatment system 10). During normal operation of the system 20, 24, the control module 32 may adjust the pressure data received from the pressure sensor 40, 52 by an amount equal to the value of the pressure recorded at step 140. The correction value recorded at step 140 and applied at step 150 may correspond to a pressure head corresponding to the difference in vertical height between the injector 38, 50 and the pressure sensor 44, 56.

For example, if the injector 38, 50 is disposed vertically higher off of the ground upon which the vehicle is situated than the pressure sensor 44, 56, the control module 32 may, at step 150, add the correction value recorded at step 140 from future pressure data received from the pressure sensor 44, 56 when the pump 36, 48 is operating. Therefore, if the control module 32 determines that a fluid pressure at the injector 38, 50 of 550 kPa (for example) is desirable during normal operation of the system 20, 24 to inject a desired amount of fluid into the exhaust stream, the control module 32 may control the pump 36, 48 to target a fluid pressure of 650 kPa at the pressure sensor 44, 56 (assuming, for example, that the static head pressure value measured and stored at step 140 is 100 kPa). That is, for configuration where a static head pressure of fluid in the supply conduit 40, 52 between the pressure sensor 44, 56 and the injector 38, 50 is equal to 100 kPa, the fluid pressure at the injector 38, 50 will be 550 kPa when the fluid pressure at the pressure sensor 44, 56 is equal to 650 kPa.

The method 100 provides a means for automatically calibrating control of the injection systems 20, 24 to account for a vertical distance between the injector 38, 50 and the pressure sensor 44, 56 without the vertical distance having to be initially known or manually input into the storage of the control module 32. That is, the method 100 described above can be performed on any of a variety of vehicles having injectors 38, 50 and pressure sensors 44, 56 having a variety of different vertical spacings therebetween without having to have a custom calibration value input into the control module 32 for a specific vehicle architecture.

It can be experimentally determined whether the correction value recorded at step 140 is more accurately determined when the return conduit 42, 54 is substantially filled with fluid or if the correction value recorded at step 140 is more accurately determined when the return conduit 42, 54 is substantially empty of fluid. If the latter is determined to yield a more accurate correction value, the control module 32 may energize the injector 38, 50 to allow atmospheric pressure to empty the return conduit 42, 54 by pushing the fluid in the return conduit 42, 54 back to the tank 34, 46. This step of emptying the return conduit 42, 54 may be performed after step 120 and before or during step 130.

While the aftertreatment system 10 is described above as including the hydrocarbon injection system 20 and the urea injection system 24 and the method 100 is described above as being a method of controlling the hydrocarbon injection system 20 and/or the urea injection system 24, it will be appreciated that the principles of the present disclosure are applicable to an injection system of an exhaust aftertreatment system that injects any other type of fluid into an exhaust stream for purposes of exhaust aftertreatment. For example, the principles of the present disclosure may be applicable to an injection system for injecting fuel into the burner 18 for ignition within the burner 18. Therefore, the system 10 and the method 100 are described above with respect to the hydrocarbon injection system 20 and the urea injection system 24 to illustrate exemplary embodiments of the system and method of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An aftertreatment system for treating exhaust gas discharged from a combustion engine, the aftertreatment system comprising:
    a tank containing a volume of a fluid;
    an injector configured to inject the fluid into a stream of exhaust gas discharged from the combustion engine;
    a supply conduit fluidly connecting the tank and the injector;
    a pump pumping the fluid from the tank to the injector;
    a pressure sensor engaging the supply conduit; and
    a control module in communication with the pressure sensor and the pump and controlling the pump based on first and second measurements from the pressure sensor, the first measurement indicative of a first pressure within the supply conduit when the pump is operating, the second measurement from the pressure sensor indicative of a pressure head within the supply conduit when the pump is not operating, the controller determining a correction value based on the second measurement and applying the correction value to future pressure sensor measurements when the pump is operating to account for the pressure head.

2. The aftertreatment system of claim 1, wherein the control module controls operation of the pump based on a sum of the first and second measurements.

3. The aftertreatment system of claim 1, wherein the second measurement is taken when the supply conduit is filled with the fluid.

4. The aftertreatment system of claim 1, further comprising a return conduit fluidly coupling the injector and the tank, wherein the second measurement is taken with the return conduit empty of the fluid.

5. The aftertreatment system of claim 1, further comprising a return conduit fluidly coupling the injector and the tank, wherein the second measurement is taken with the return conduit filled with the fluid.

6. The aftertreatment system of claim 1, wherein the fluid includes urea.

7. The aftertreatment system of claim 1, wherein the fluid includes a hydrocarbon fluid.

8. An aftertreatment system for treating exhaust gas discharged from a combustion engine, the aftertreatment system comprising a tank containing a volume of a fluid; an injector configured to inject the fluid into a stream of exhaust gas discharged from the combustion engine; a pump pumping the fluid from the tank to the injector; and a control module in communication with the pump and operable to determine a correction value to account for a pressure head corresponding to a vertical height of the injector, the control module applying the correction value to control the pump.

9. The aftertreatment system of claim 8, further comprising a pressure sensor in communication with the control module and engaging a supply conduit fluidly connecting the tank and the injector, wherein the control module controls the pump based on data received from the pressure sensor.

10. The aftertreatment system of claim 9, wherein the vertical height is a vertical distance between the pressure sensor and the injector.

11. The aftertreatment system of claim 9, wherein the data received from the pressure sensor includes a first measurement indicative of a first pressure within the supply conduit when the pump is operating and a second measurement indicative of a second pressure within the supply conduit when the pump is not operating.

12. The aftertreatment system of claim 11, further comprising a return conduit fluidly coupling the injector and the tank, wherein the second measurement is taken with the return conduit empty of the fluid.

13. The aftertreatment system of claim 11, further comprising a return conduit fluidly coupling the injector and the tank, wherein the second measurement is taken with the return conduit filled with the fluid.

14. The aftertreatment system of claim 8, wherein the fluid includes urea.

15. The aftertreatment system of claim 8, wherein the fluid includes a hydrocarbon fluid.

16. A method of controlling a pump of a fluid injection system for an exhaust aftertreatment system comprising:
   operating the pump to achieve a stable target pressure in a supply conduit connecting the pump and an injector of the fluid injection system;
   shutting off the pump after the stable target pressure is achieved;
   allowing a fluid pressure within the supply conduit to stabilize after shutting off the pump;
   acquiring a first fluid pressure measurement within the supply conduit after the fluid pressure is allowed to stabilize to account for a pressure head that exists due to a vertical distance between the injector and a location at which the first fluid pressure measurement is made;
   operating the pump after acquiring the first fluid pressure; and
   controlling operation of the pump based on the first and second fluid pressure measurement to account for the pressure head existing in the supply conduit when the pump is off.

17. The method of claim 16, further including acquiring a second fluid pressure measurement within the supply conduit during the operation of the pump after acquiring the first fluid pressure, wherein controlling operation of the pump based on the first and second fluid pressure measurements includes adding the first fluid pressure measurement to the second fluid pressure measurement.

18. The method of claim 16, wherein the fluid injection system includes a return conduit fluidly coupling the injector with a tank, wherein the first fluid pressure measurement is acquired with the return conduit empty of injection fluid.

19. The method of claim 16, wherein the fluid injection system includes a return conduit fluidly coupling the injector with a tank, wherein the first fluid pressure measurement is acquired with the return conduit filled with injection fluid.

* * * * *

UNITED STATES PATENT AND TRADEMARK OFFICE
CERTIFICATE OF CORRECTION

| | | |
|---|---|---|
| PATENT NO. | : 9,221,014 B2 | Page 1 of 1 |
| APPLICATION NO. | : 14/085308 | |
| DATED | : December 29, 2015 | |
| INVENTOR(S) | : Gary Butzke | |

It is certified that error appears in the above-identified patent and that said Letters Patent is hereby corrected as shown below:

In the Claims:

Col. 10, lines 10-11: In claim 16, after "first" delete "and second fluid"

Signed and Sealed this
Twelfth Day of April, 2016

Michelle K. Lee
*Director of the United States Patent and Trademark Office*